(12) United States Patent
Han (10) Patent No.: US 7,819,249 B2
(45) Date of Patent: Oct. 26, 2010

(54) VERSATILE PACKAGING BOX FOR PRODUCTS

(76) Inventor: Yihe Han, Building Oulujingdian 9-903, No. 172, Beiyuan Road, Chaoyang District, Beijing (CN) 100101

(*) Notice: Subject to any disclaimer, the term of this patent is extended or adjusted under 35 U.S.C. 154(b) by 169 days.

(21) Appl. No.: 11/908,701

(22) PCT Filed: Jul. 12, 2005

(86) PCT No.: PCT/CN2005/001023

§ 371 (c)(1),
(2), (4) Date: Sep. 14, 2007

(87) PCT Pub. No.: WO2006/097017

PCT Pub. Date: Sep. 21, 2006

(65) Prior Publication Data

US 2008/0169338 A1    Jul. 17, 2008

(30) Foreign Application Priority Data

Mar. 14, 2005  (CN) ............... 2005 2 0005918 U
Mar. 15, 2005  (CN) ............... 2005 2 0005882 U (51) Int. Cl.
*A45F 5/12*  (2006.01)
(52) U.S. Cl. ............. 206/424; 229/87.02; 229/87.19
(58) Field of Classification Search ............ 206/424, 206/232, 83.5, 449; 229/87.02, 87.18, 87.19, 229/101, 101.1, 101.2, 124, 103.3
See application file for complete search history.

(56) References Cited

U.S. PATENT DOCUMENTS 1,125,535 A * 1/1915 Hoffman ............... 229/101
1,677,918 A * 7/1928 Gallistel ............... 206/424
3,252,650 A * 5/1966 Pryor ............... 229/103.3

(Continued)

FOREIGN PATENT DOCUMENTS

CN    2194268 Y    4/1995

(Continued)

OTHER PUBLICATIONS

International Search Report for PCT/CN/2005/001023 (of WO 2006097017) dated Dec. 22, 2005.

*Primary Examiner*—Luan K Bui
(74) *Attorney, Agent, or Firm*—Heslin Rothenberg Farley & Mesiti P.C.

(57) ABSTRACT

A versatile packaging box for products, which can be folded into a book cover or an envelope for the contained book, is disclosed. On its front, rear, left and right vertical panels a folding line whose position is adapted to the thickness of the contained book is respectively provided. The front, rear, left and right vertical panels are provided with foldable end panels. The height of the part of the left and right vertical panels above the fold line and below the end panel and the length of end panel add up to the length of the front cover of said book. When the end panel is folded onto the inner side of the rear and front vertical panels, the height of the part of the rear and front vertical panel above the fold line and below the end panel is equal to the width of the front cover of said book. The packaging box has the advantages as follows: making full use of the used packaging box, beautifying and protecting the contained book, and reducing waste.

9 Claims, 6 Drawing Sheets

U.S. PATENT DOCUMENTS

| | | | | |
|---|---|---|---|---|
| 3,683,987 A | * | 8/1972 | Robertson | 229/87.01 |
| 3,791,571 A | * | 2/1974 | Pilz, III | 206/424 |
| 5,018,663 A | * | 5/1991 | Corso | 229/117.13 |
| 5,477,965 A | * | 12/1995 | Herbeck | 206/424 |
| 6,041,998 A | * | 3/2000 | Goldberg | 229/193 |
| 6,676,009 B1 | * | 1/2004 | Rose | 229/101 |

FOREIGN PATENT DOCUMENTS

| | | |
|---|---|---|
| CN | 2191193 Y | 8/1995 |
| CN | 2438663 Y | 7/2001 |
| CN | 1526616 A | 8/2004 |
| EP | 0603113 A1 | 6/1994 |
| JP | 2000-355378 A | 12/2000 |
| WO | WO 2006097017 A1 | 9/2006 |

* cited by examiner

PRIOR ART

VERSATILE PACKAGING BOX FOR PRODUCTS

CROSS-REFERENCE TO RELATED APPLICATIONS

This application is a §371 filing of PCT application CN 2005/001023 which claims priority from Chinese application 200520005918.1 filed on Mar. 14, 2005 and Chinese application 200520005882.7 filed on Mar. 15, 2005. The disclosures of these applications are included by reference herein in their entirety.

FIELD OF THE INVENTION

The present invention is generally related to packaging boxes, and more particularly to versatile packaging boxes including those for cigarettes, wine, tea and moon cake incorporating a special compartment for books.

BACKGROUND OF THE INVENTION

The current packaging boxes available in the market, as up-scale as they can, have a simple structure and little functionality except for holding the items contained therein. The used packaging boxes will be disposed other than retained for further use, which is a waste of resources and an adverse impact on the environment.

Figure 9:
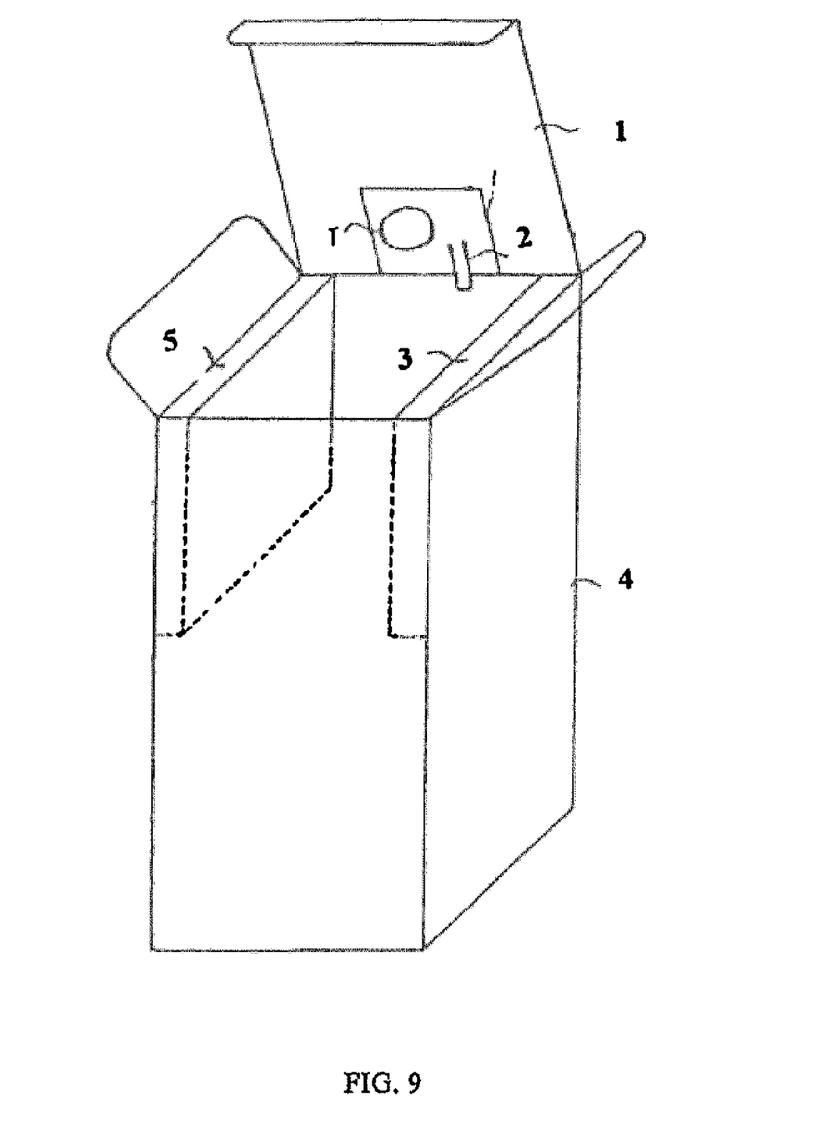
FIG. 9 is a perspective view of a publicly known packaging box.

Referring to FIG. 9, there is illustrated a new type of wine packaging box that after the product 3 and the book 5 are removed, the box 4 will be disposed. Slot-type compartments are provided on its inner walls to hold drunkenness relieving tea, drinking game cards, booklets or brochures. However, once the items contained are removed, the packaging box becomes useless.

There continues to be a need to convert the packaging box into the cover of complimentary book to create an integration of product package and the book introducing the product culture, so as to utilize the resources efficiently while preventing pollution. In addition, it can build up the cultural taste of the product.

SUMMARY OF THE INVENTION

The present invention is intended to provide a versatile packaging box that can be folded into the cover of the complimentary book after the product is removed to create an integration of product package and the book introducing the product culture and enable efficient use of packaging materials and less waste. The present invention is a normal packaging box when holding the product inside it and, after the product is removed, can be converted into the cover of the complimentary book.

The purpose of the present invention is achieved as follows: it is a versatile packaging box in a rectangular form, intended for holding the product and the complimentary book, with the back cover of the book attached to the bottom of the box. A versatile packaging box for products, which can be folded into a book cover or an envelope for the contained book, is disclosed. On its front, rear, left and right vertical panels, a folding line whose position is adapted to the thickness of the contained book is respectively provided. The front, rear, left and right vertical panels are provided with foldable end panels. The height of the remaining part of the left vertical panel above the folding line and below the end panel and the length of end panel add up to the length of the front cover of said book, and so is the sum of the height of the remaining part of the right vertical panel above the folding line and below the end panel and the length of end panel. When the end panel is folded onto the inner side of the rear vertical panel, the height of the remaining part of the rear vertical panel above the folding line and below the end panel is equal to the width of the front cover of said book. When the end panel is folded onto the inner side of the front vertical panel, the height of the remaining part of the front vertical panel above the folding line and below the end panel is also equal to the width of the front cover of said book.

A fastening device is provided at the end panel of the said packaging box finally converted into a book cover.

Detachable fastening device provided between the left and right vertical panels and the bottom surface of said packaging box can be nylon buckle or double-sided adhesive tape, etc. When converted into a book cover, the height of rest part of the front and rear panels is equal to the width of the front cover of said book. The end panels are folded onto the inner side of the front and rear panels respectively, and the left and right panels can be removed.

When the said packaging box is used as a book cover, the rest part of said front and rear vertical panels and the end panels, after folding, encase the upper cover of the book with its total length equal to the total width of the book; the rest part of said left and right vertical panels and the end panels, after folding, create a lining for the upper cover of the book with its total length equal to the total length of the book.

Detachable fastening device provided between the left and right vertical panels and the bottom surface of said packaging box can be nylon buckle or double-sided adhesive tape, etc.

The front, rear, left and right vertical panels of said packaging box are provided with foldable end panels. The upper and lower end panels join each other to form top surface and bottom surface respectively. A vertical folding line is provided in the left vertical panel and the distance between such line and the front vertical panel is equal to the thickness of said book. A vertical folding line is provided in the right vertical panel and the distance between such line and the back vertical panel is equal to the thickness of said book. The said front, rear, left and right vertical panels are provided with foldable end panels. The upper and lower end panels join each other to form top surface and bottom surface respectively. A vertical folding line is provided in the left vertical panel and the distance between such line and the front vertical panel is equal to the thickness of said book. A vertical folding line is provided in the right vertical panel and the distance between such line and the back vertical panel is equal to the thickness of said book.

A fastening device is provided between the front vertical panel and the right vertical panel of the said packaging box. The outer surface of the fastener can be attached and detached from the inner side of the front vertical panel.

The present invention facilitate the efficient use of the storage space inside the packing box by holding the book introducing Chinese wine culture inside it while using the product package as a book cover. There is no need for disposal of the used product package and what's more, the cultural image of the product is enhanced. Therefore, it is a solution for saving resources, preventing pollution, popularizing corporate and regional culture, and building recognition.

The following is a detailed description of the present invention based on the attached drawings. For convenience, the following terms, when mentioned herein, shall have the following meanings. Front vertical panel refers to the side of packaging box in front of the observer. Left vertical panel refers to the side of packaging box on the left side of the observer. Right vertical panel refers to the side of packaging box on the right side of the observer. Rear vertical panel refers to the forth side. Same numbers used in these drawings refer to identical or similar components.

DETAILED DESCRIPTION OF PREFERRED EMBODIMENTS

Figure 5:
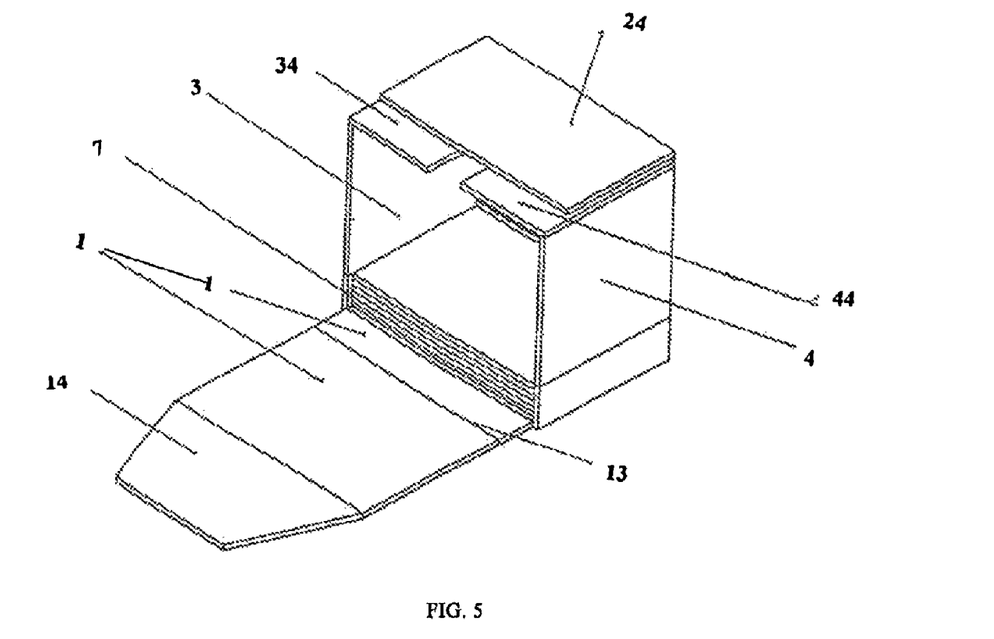
FIG. 5 is a perspective view of another embodiment of a packing box.
Figure 6:
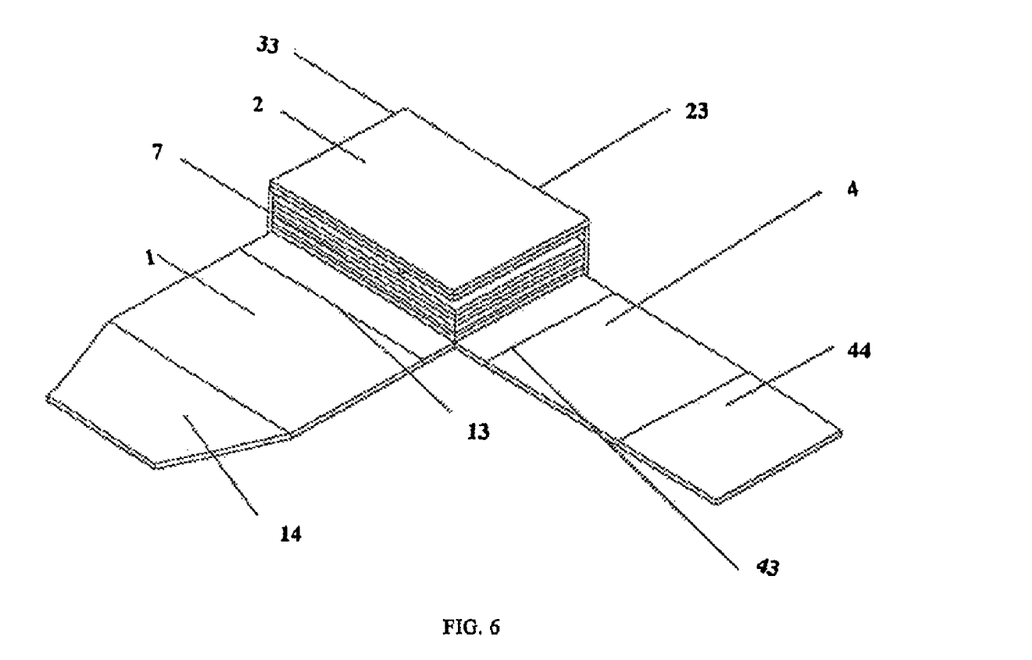
FIG. 6 is a perspective view of a book envelope converted from the embodiment of the packing box illustrated in FIG. 5.

Referring to FIG. 5 and FIG. 6, FIG. 5 is a perspective view of an embodiment of packing box and FIG. 6 is a perspective view of a book envelope converted from the embodiment of packing box illustrated in FIG. 5. FIG. 5 illustrates a packaging box in rectangular form intended for holding the product and the complimentary book 7. The back cover of the book is attached to the bottom 6 (not marked). Folding lines 13, 23, 33 and 43, adapted to the thickness of the book contained, are provided on the front panel 1, rear panel 2, left panel 3 and right panel 4; and end panels 14, 24, 34 and 44 are provided on the front, rear, left and right vertical panels. Referring to FIG. 6, when the product is removed, the left panel 3 is folded along the folding line 33 towards the book 7. The height of the remaining part of the left panel 3 above folding line 33 and below the end panel 34 and the length of end panel 34, when covering the upper cover of book 7, add up to the length of the front cover of book 7. Then, the rear panel 2 is folded along the folding line 23 towards the book 7. The height of the remaining part of the rear panel 2 above folding line 23 and below the end panel 24 is equal to the width of the front cover of said book, and the end panel 24 of side 2 is folded onto the inner side of panel 2. The portion of panel 2 above folding line 23 and below end panel 24 of rear vertical panel 2 is placed onto the left vertical panel 3 previously folded on the upper cover of book 7, and then the right panel 4 is folded along the folding line 43 towards the book 7. The height of the remaining part of the right panel 4 above folding ling 43 and below the end panel 44 and the length of end panel 44 of panel 4, when covering the folded rear panel 2 on the upper cover of book 7, add up to the length of the front cover of the book 7. Then, the front panel 1 is folded along the folding line 13 towards the right panel 4 already folded onto the book 7 with the height of the remaining part of the front panel 1 above folding line 13 and below the end panel 14 are equal to the width of the front cover of said book 7, and the end panel 14 folded onto the inner side of the said panel 1. In this way, the packaging box is converted into the book cover of book 7. In view of the board thickness, the distance between the folding lines 13, 23, 33, and 43 and the bottom surface can be properly increased according to the folding procedure.

A fastening device is provided at the remained end panel of the said packaging box that is converted into a book cover. Detachable fastening device can be nylon buckle or double-sided adhesive tape, etc.

Figure 7:
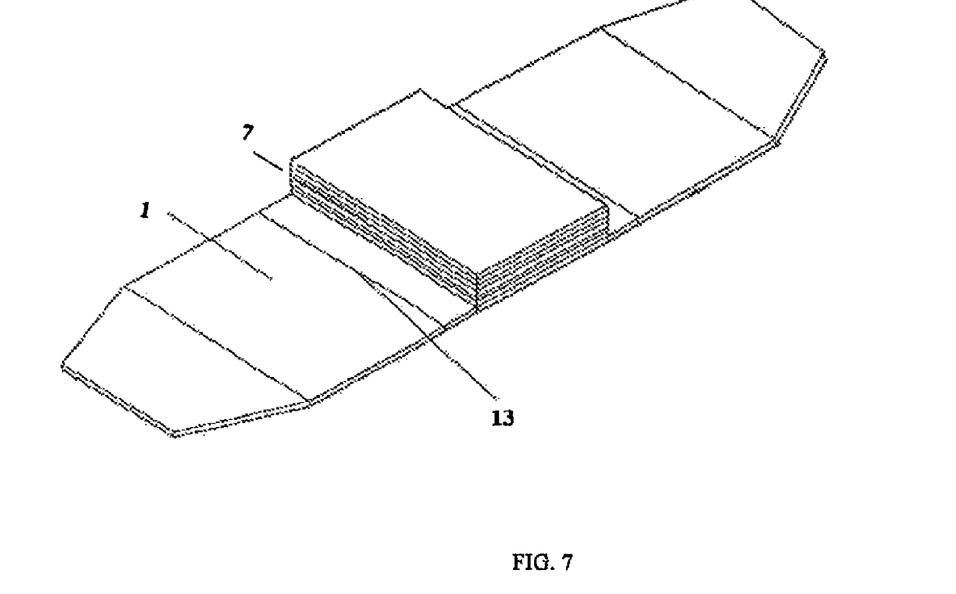
FIG. 7 is a perspective view of a book envelope converted from another embodiment of the packing box.

FIG. 7 illustrates the remaining part of an embodiment when the items contained are removed. Detachable fastening device provided between the left panel 3 and right panel 4 and the bottom surface of said packaging box can be nylon buckle or double-sided adhesive tape, etc. To create a book cover, the part of front panel 1 above folding line 13 and rear panel 2 above the folding line 23 and below end panel 24 have a height equal to the width of front cover of said book and the end panels 14, 24 are folded onto the inner side of said front and rear panels 1 and 2 respectively. The said left and right panels 3 and 4 can be removed, so that the said front and rear panels 1 and 2 can be folded towards the said book in turn to form the envelope of book 7. Otherwise, the left and right panels 3 and 4 and the end panels 34 and 44 in turn can be inserted into the inner side of back cover of book 7 to form the cover of book 7.

Figure 8:
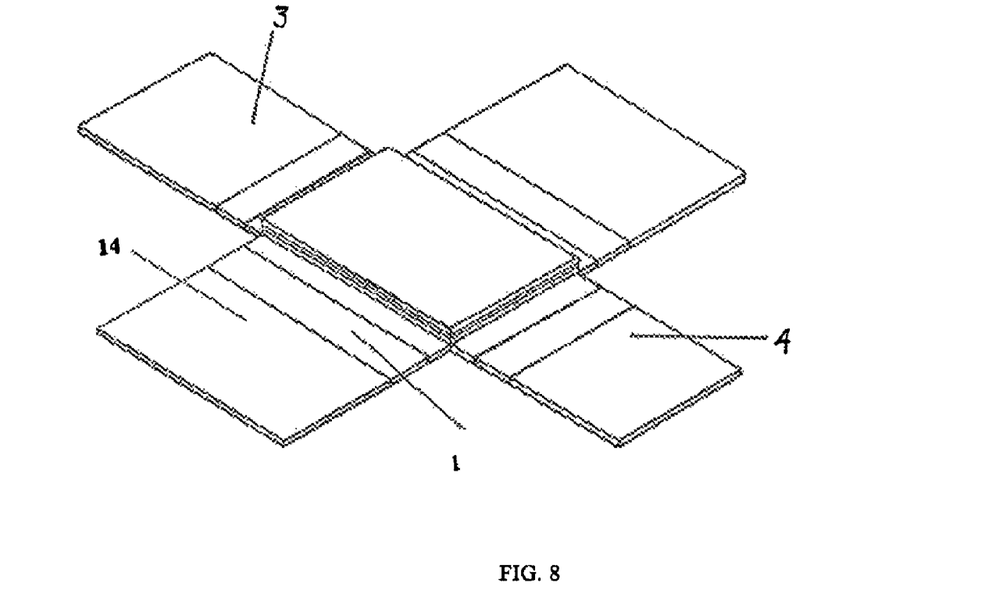
FIG. 8 is a perspective view of a book envelope converted from another embodiment of the packing box.

FIG. 8 illustrates an embodiment of unfolded packaging box. By folding left panel 3, right panel 4, rear panel 2 and front panel 1 towards the book 7 in turn and, after folding, the part of front panel 1 above folding line 13 and rear panel 2 above folding line 23 and the end panels 14 and 24 encase the upper cover of the book 7 with its total length adapted to the total width of the book; the part of left panel 3 above folding line 33 and right panel 4 above folding line 43 and the end panels 34 and 44, create a lining for the upper cover of the book with its total length equal to the total length of the book.

Referring to FIG. 1, FIG. 2, FIG. 3 and FIG. 4, end panels 14, 24, 34, and 44 are provided at the top and bottom of front panel 1, rear panel 2, left panel 3 and right panel 4 of said packaging box. These end panels 14, 24, 34, and 44 join each other to form top surface 5 and bottom surface 6 respectively. A vertical folding line 33 is provided in said left panel 3 and the distance between such line 33 and the front panel 1 is equal to the thickness of said book. A vertical folding line 43 is provided in the right panel 4 and the distance between such line 44 and the back panel 2 is equal to the thickness of said book. During packaging, the product and the book (in roll) are placed in the packaging box. After the product is removed, the end panels 14, 24, 34, and 34 are folded to the inner side of each panel and then the shape of packaging box is changed into the one illustrated in FIG. 2 by pressing along the folding lines 33 and 43. The front panel 1 and the part of left panel above folding line 13 form the rear part of book envelope of the book 7. In this way, the packaging box is converted into the book envelope of the unrolled book.

Figure 1:
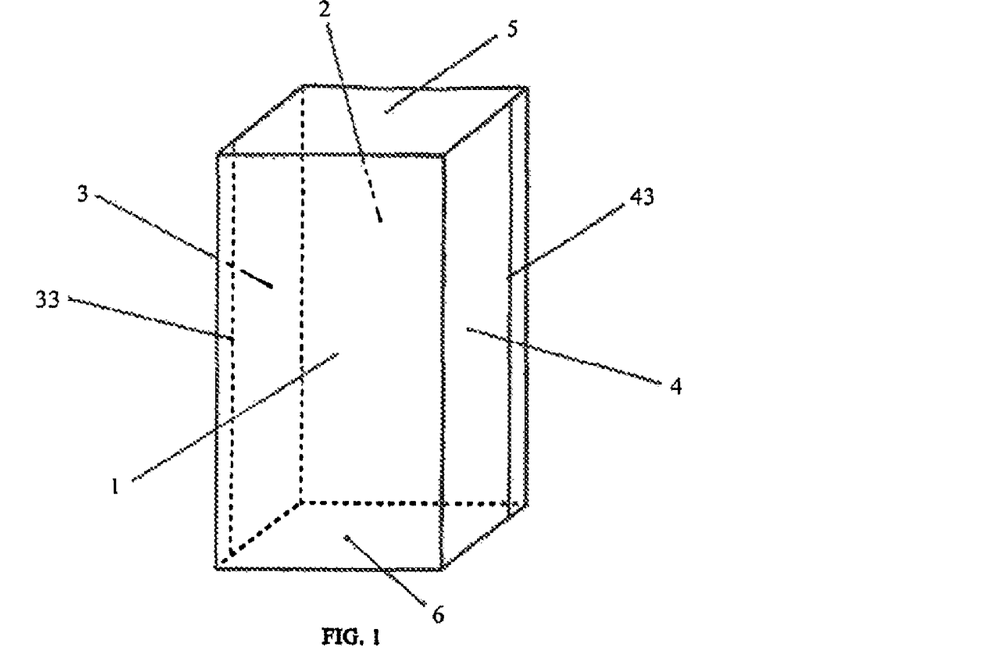
FIG. 1 is a perspective view of an embodiment of a packing box.
Figure 2:
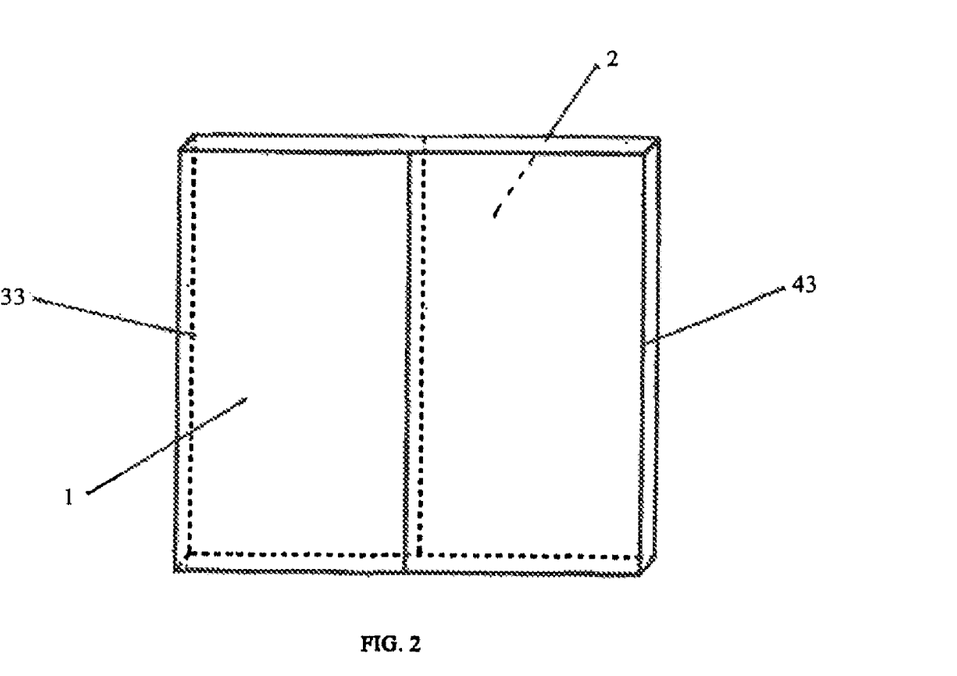
FIG. 2 is a perspective view of a book envelope converted from the embodiment of the packing box illustrated in FIG. 1.
Figure 3:
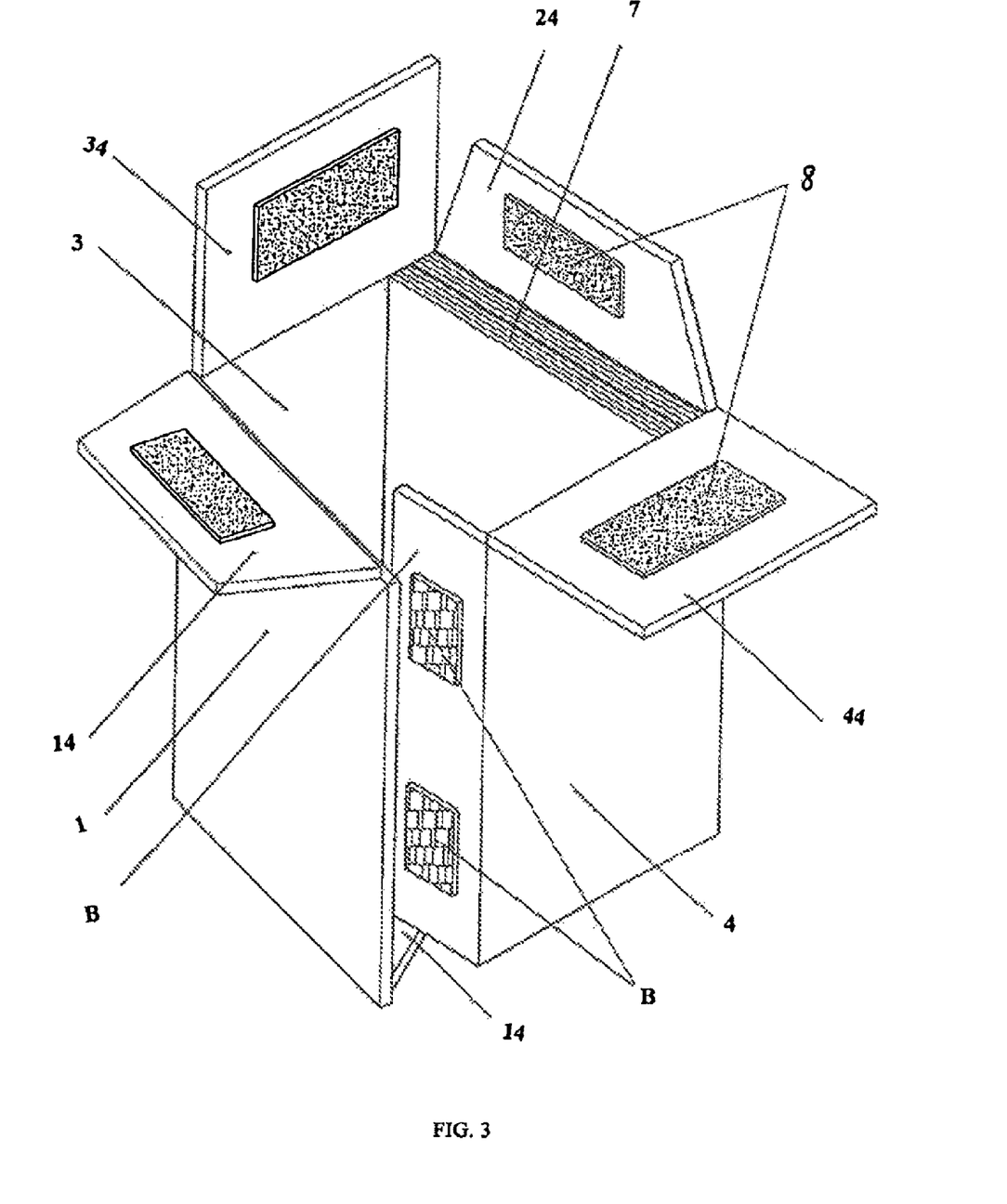
FIG. 3 is a perspective view of another embodiment of a packing box.
Figure 4:
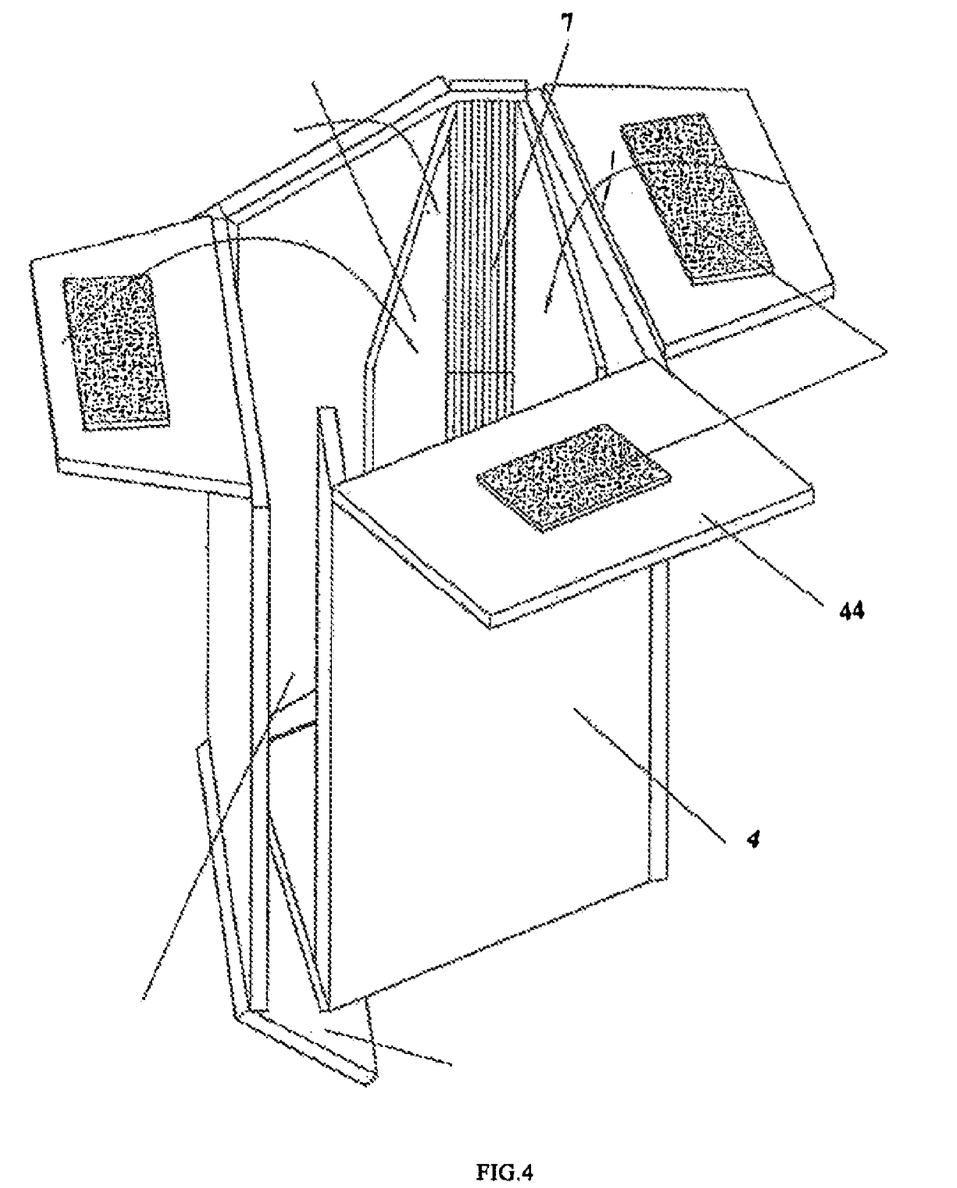
FIG. 4 is a perspective view of a book envelope converted from the embodiment of the packing box illustrated in FIG. 3.

Referring to FIG. 3 and FIG. 4, FIG. 3 illustrates the book 7 folded and placed in the packaging box and FIG. 4 illustrates the book 7 unfolded. A fastening device B is provided between the front panel 1 and the right panel 4. The outer surface the fastening device B can be attached and detached from the inner side of the front panel 1 by means of nylon buckle or double-sided adhesive tape. This embodiment is similar to the one illustrated in FIG. 1 and FIG. 2 except for the fastening device B. After the product is removed, the fastening device B is detached and the packaging box is pressed along folding lines 33 and 43, the front panel 1 and the upper and lower end panels 44 of right panel 4 are folded towards the inner side of front cover of book 7 to form the front book cover, and then the rear panel 2 and the upper and lower end panels 34 of left panel 3 are folded towards the inner side of back cover of book 7 to form the rear book cover. In this way, the packaging box is converted into the book cover of book 7.

INDUSTRIAL APPLICABILITY

In view of the need that the size of packaging box should be adapted to that of product and book contained, the matching between panels and end panels and the position of folding lines should be determined by the designer according to the actual situations and therefore not addressed herein. The present invention has a number of advantages. There is no need for disposal of the used product package and what's more, the cultural image of the product is enhanced. Therefore, it is a solution for saving resources, preventing pollution, popularizing corporate and regional culture, and building recognition.

The invention claimed is:

1. A packaging box and a book comprising:
a bottom panel receiving the book;
a front panel, a rear panel, a left panel, and a right panel, each panel mounted to the bottom panel, each panel having a folding line positioned from the bottom panel a distance substantially equal to a thickness of the book, and each panel having a foldable end panel;
wherein a sum of a distance between the folding line of the left panel and the end panel of the left panel and the length of the end panel of the left panel substantially equal a length of said book;
wherein a sum of a distance between the folding line of the right panel and the end panel of the right panel and the length of the end panel of the right panel substantially equal the length of said book;
wherein the end panel of the rear panel is folded onto an inner side of the rear panel, and wherein a distance between the folding line of the rear panel and the end panel of the rear panel is substantially equal to a width of said book; and
wherein the end panel of the front panel is folded onto an inner side of the front panel, and wherein a distance between the folding line of the front panel and the end panel of the front panel is substantially equal to the width of said book.

2. The packaging box and book as in claim 1, wherein the box further comprises a detachable fastening device between the left and right panels, and wherein the detachable fastening device comprises one of a nylon buckle and a double-side adhesive tape.

3. The packaging box and book as in claim 1, wherein the distance between the folding lines and the end panels of the front and rear panels encase the book and create a lining for the book.

4. The packaging box and book as in claim 1, wherein each panel includes an upper and lower end panel, and wherein the upper and lower end panels form a top surface and bottom surface; and wherein a distance between the folding line of the right panel and the rear panel is equal to the thickness of said book.

5. The packaging box and book as in claim 4, further comprising a fastening device adapted to releasably attach the front panel to the right panel.

6. The packaging box and book as in claim 1, further comprising a fastening device adapted to releasably attach one of the end panels to one of the panels to form a book cover.

7. The packaging box and book as in claim 2, wherein the distance between the folding line and the end panel of the front panel and the distance between the folding line and the end panel of the rear panel comprise a height equal to a width of the book, and wherein the end panels of the front panel and the rear panel are folded onto an inner side of said front and rear panels.

8. The packaging box and book as in claim 7, wherein the left panel and the right panel are removable.

9. The packaging box and book as in claim 1, wherein each panel comprises a board.

* * * * *